United States Patent [19]

Adam et al.

[11] 4,336,377

[45] Jun. 22, 1982

[54] BASIC DIOXAZINE COMPOUNDS

[75] Inventors: Jean-Marie Adam, St. Louis; Pierre Galafassi, Rixheim, both of France

[73] Assignee: Ciba-Geigy Corporation, Ardsley, N.Y.

[21] Appl. No.: 116,196

[22] Filed: Jan. 28, 1980

[30] Foreign Application Priority Data

Feb. 2, 1979 [CH] Switzerland ............... 1041/79

[51] Int. Cl.$^3$ ............................................. C09B 19/00
[52] U.S. Cl. ........................................... 544/74; 8/655
[58] Field of Search ................................ 544/74; 8/655

[56] References Cited

U.S. PATENT DOCUMENTS

| | | | |
|---|---|---|---|
| 3,252,964 | 5/1966 | Fuchs et al. | 260/152 |
| 3,293,246 | 12/1966 | Fuchs et al. | 544/128 |
| 3,518,247 | 6/1970 | Altermatt et al. | 260/156 |
| 3,620,663 | 11/1971 | Kruckenberg | 8/655 X |
| 3,671,529 | 6/1972 | Altermatt et al. | 8/655 X |
| 3,892,742 | 7/1975 | Parton | 544/74 |
| 3,912,732 | 10/1975 | Burdeska et al. | 544/74 |
| 4,055,392 | 10/1977 | Koller et al. | 8/655 X |

FOREIGN PATENT DOCUMENTS

| | | |
|---|---|---|
| 784844 | 10/1957 | United Kingdom . |
| 850159 | 9/1960 | United Kingdom . |
| 994482 | 6/1965 | United Kingdom . |
| 1085018 | 9/1967 | United Kingdom ............. 8/655 |

OTHER PUBLICATIONS

Chemical Abstracts, Fourth Decennial Index, vols. 31–40, Subjects Proteus-Z, p. 9533, Am. Chem. Soc. 1949.
Chemical Abstracts, Fifth Decennial Index, vols. 41–50, Subjects Th-Z, American Chem. Soc. (1962).
Chemical Abstracts, Sixth Collective Index, vols. 51–55, Subjects Sp-Z, Am. Chem. Soc. (1966).
Chem. Abstracts, Seventh Collective Index, vols. 56–65, Subjects Tim-Z, Am. Chem. Soc. (1970).
Chem. Abstracts, Eighth Collective Index, vols. 66–75, Subjects Tripet-Z, Am. Chem. Soc. (1973).
Chem. Abstracts, vol. 89, 5590CS L979.

*Primary Examiner*—Richard Raymond

*Attorney, Agent, or Firm*—Edward McC. Roberts

[57] ABSTRACT

Novel dioxazine compounds of the formula

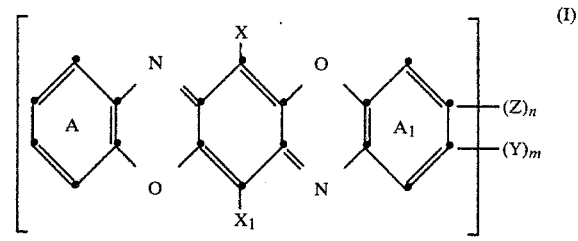

in which Z is a basic group, which can be quaternized, Y is an anionic group and X and $X_1$ independently of one another are identical or different substituents from the category comprising: hydrogen, halogen, CN, substituted or unsubstituted alkyl ($C_1$–$C_4$); substituted or unsubstituted phenyl; $NHCOR_1$ in which $R_1$ is alkyl ($C_1$–$C_4$), cycloalkyl, substituted or unsubstituted aryl or a heterocyclic radical; and $OCOR_2$ in which $R_2$ is substituted or unsubstituted alkyl ($C_1$–$C_4$) or cycloalkyl; or X and $X_1$ are the group

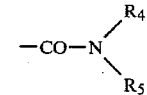

in which $R_4$ and $R_5$ independently of one another are: hydrogen, substituted or unsubstituted alkyl ($C_1$–$C_4$), cycloalkyl or aryl, or $R_4$ together with $R_5$ and with the inclusion of the N atom forms a heterocyclic ring, or X and $X_1$ are the group $COOR_6$, in which $R_6$ is hydrogen, substituted or unsubstituted alkyl or cycloalkyl; n is a number from 1 to 4 and m is a number from 0 to 2, with the proviso that the number m is smaller than n, and in which the benzo radicals A and $A_1$ can be identical or different and can have one or more further substituents, their preparation and their use as dyes, in particular for dyeing and printing natural and regenerated cellulose materials without the addition of salt, are described.

10 Claims, No Drawings

BASIC DIOXAZINE COMPOUNDS

The invention relates to novel basic dioxazine compounds, processes for their preparation and their use as dyes for dyeing and printing textile materials, paper and leather and for preparing inks.

The novel basic dioxazine compounds have the formula I

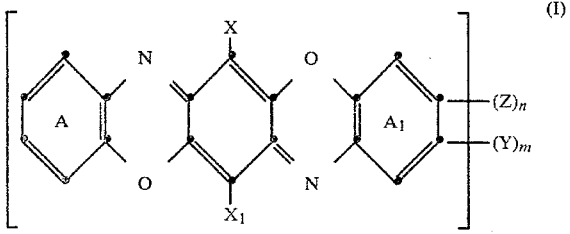

in which Z is a basic group, which can be quaternised, Y is an anionic group and X and $X_1$ independently of one another are identical or different substituents from the category comprising: hydrogen, halogen, CN, substituted or unsubstituted alkyl ($C_1$–$C_4$); substituted or unsubstituted phenyl; $NHCOR_1$ in which $R_1$ is alkyl ($C_1$–$C_4$), cycloalkyl, substituted or unsubstituted aryl or a heterocyclic radical; and $OCOR_2$ in which $R_2$ is substituted or unsubstituted alkyl ($C_1$–$C_4$) or cycloalkyl; or X and $X_1$ are the group

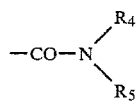

in which $R_4$ and $R_5$ independently of one another are: hydrogen, alkyl ($C_1$–$C_4$), which is unsubstituted or substituted by aryl, in particular phenyl, or by a basic group

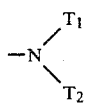

or cationic group

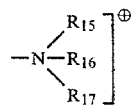

in which $T_1$ is H or a low-molecular alkyl radical, which is unsubstituted or substituted by hydroxyl, or a cyclohexyl radical, which is unsubstituted or substituted by 1 to 3 methyl radicals, or a phenyl radical and $T_2$ is a low-molecular alkyl radical, which is unsubstituted or substituted by hydroxyl; or the radicals $T_1$ and $T_2$ together with the N atom can form a pyrrolidine, morpholine or piperazine ring, and $R_{15}$ and $R_{17}$ are each a substituted or unsubstituted alkyl radical ($C_1$–$C_4$) or a cycloalkyl radical and $R_{16}$ is a substituted or unsubstituted alkyl radical ($C_1$–$C_4$), a cycloalkyl radical, an alkoxy radical or a $NH_2$ group, or two of the radicals $R_{15}$, $R_{16}$ and/or $R_{17}$ form, together with the nitrogen atom, a heterocyclic ring, for example the substituted or unsubstituted pyridine ring; or $R_4$ and $R_5$ are cycloalkyl or aryl, or $R_4$ together with $R_5$ and with the inclusion of the N atom form a heterocyclic ring, for example the pyrrolidine, piperidine or morpholine ring, or X and $X_1$ are $COOR_6$, in which $R_6$ is hydrogen, unsubstituted alkyl having 1 to 4 C atoms, or alkyl substituted, for example, by OH or phenyl or cycloalkyl; n is a number from 1 to 4 and m is a number from 0 to 2, with the proviso that the number m is smaller than n, and in which the benzo radicals A and $A_1$ can be identical or different and can have one or more further substituents.

An alkyl group X or $X_1$ is an unbranched or branched alkyl group having 1 to 4 carbon atoms, which can be substituted; it is, for example, the methyl, ethyl, n-propyl, iso-propyl or n-, sec.- or tert.-butyl group; a substituted or unsubstituted phenyl group X or $X_1$ is unsubstituted phenyl or a phenyl group which is substituted, for example, by alkyl groups, which are branched or unbranched and have 1 to 4 carbon atoms, or halogen, such as fluorine, chlorine or bromine; a $NHCOR_1$ group X or $X_1$ in which $R_1$ is alkyl ($C_1$–$C_4$), cycloalkyl, substituted or unsubstituted aryl or a heterocyclic ring is, for example, the methyl-, ethyl-, cyclohexyl-, phenyl-, alkylphenyl- or halogenophenyl-carbonylamino radical or the furan-, thiophene-, pyridine-, quinoline-, phenylthiazole- or phenyltriazole-carbonylamino radical and in particular the o-chlorophenyl- or methyl-carbonylamino radical.

A $OCOR_2$ group X or $X_1$ is, for example, one of the following radicals: $OCO.CH_3$; $OCO.C_2H_5$; $OCO.C_3H_7$ (n and iso) and $OCO.C_4H_9$ (n and iso) and also $OCO.CH_2.C_6H_5$ and $OCO.cyclohexyl$; a

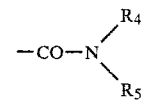

group X or $X_1$ is, for example: $CONH_2$ or $CONHC_6H_5$; and a $COOR_6$ group X or $X_1$ is, for example, one of the following radicals: COOH, $COOCH_3$ and $COOC_2H_5$, in which the alkyl radicals can also be substituted by, for example, OH or $C_6H_5$.

In preferred dioxazine compounds, X and $X_1$ are identical substituents; in particular X and $X_1$ are H, Cl, Br, $CONH_2$, $CONHC_6H_5$, $NHCOC_6H_4Cl$, NH.CO-thiophene, CN, COO-alkyl, in particular $COOCH_3$ and $COOC_2H_5$, $NHCOCH_3$, $OCOCH_3$ or alkyl, in particular $CH_3$ and $C_2H_5$, or COOH; compounds of particular interest are those in which X and $X_1$ are each a $NHCOR_1$ group in which $R_1$ is alkyl ($C_1$–$C_4$) or substituted or unsubstituted aryl, or X and $X_1$ are each, in particular, halogen, especially chlorine.

The benzo radicals A and/or $A_1$ can be identical or different and can have one or more further substituents, in addition to the groups Z and Y. Examples of possible substituents are: halogen, such as fluorine, chlorine or bromine; CN; and alkyl having 1 to 8 carbon atoms which can be unsubstituted or substituted, for example by phenyl; further possible substituents in $A/A_1$ are: unsubstituted phenyl and phenyl which can be substituted by, for example, halogen, such as fluorine, chlorine or bromine; or by COOH, $NO_2$, $NH_2$ or $NH_2$ which is monosubstituted or disubstituted on the N atom, for example substituted by alkyl ($C_1$–$C_4$); and also NHCO-alkyl ($C_1$–$C_4$) or $NHCO$-$C_6H_5$; furthermore, the phenyl in $A/A_1$ can be substituted by alkoxy ($C_1$–$C_4$) or alkyl ($C_1$-$C_4$); or A/$A_1$ can be substituted by NHCOR$_{18}$ in which R$_{18}$ is unsubstituted alkyl or alkyl which is substituted by, for example, phenyl, alkoxy, cycloalkyl, unsubstituted aryl or substituted aryl, for example unsubstituted phenyl or phenyl which is substituted by halogen, alkoxy, alkyl, NO$_2$ or CN; further substituents in A and/or A$_1$ are: NO$_2$, SCN, heterocyclic rings, for example the benzthiazole radical, which can also be further substituted, for example by alkyl ($C_1$-$C_4$); and also alkoxy groups, such as the methoxy, ethoxy or n- or isopropoxy group, which alkoxy groups can also be substituted by, for example, further alkoxy groups or by OH or phenyl; further possible groups are the phenoxy group, which is unsubstituted or substituted (for example by alkyl), and the group NHR$_{19}$, in which R$_{19}$ is hydrogen or aryl, in particular phenyl, which can be substituted or fused with hetero-rings, for example to form a benzoxazole, benzthiazole or benzimidazole, or R$_{19}$ is a hetero-ring, for example the benzthiazole ring. Finally, A and/or A$_1$ can also be further substituted by an alkylsulfonyl group or by the group CONHR$_{20}$, in which R$_{20}$ is a substituted or unsubstituted aryl radical, such as the unsubstituted phenyl radical or a phenyl radical which is substituted by halogen, such as fluorine, chlorine or bromine, or by phenyl, methyl or ethyl.

In preferred dioxazine compounds the two benzo radicals A and A$_1$ are substituted by one or more identical substituents, in particular by Cl, NHCOC$_6$H$_5$, NHCOC$_6$H$_4$Cl, NHCOC$_6$H$_4$.OCH$_3$, alkoxy ($C_1$-$C_3$) or alkoxy ($C_1$-$C_3$) substituted by OH or alkoxy or by alkyl, in particular CH$_3$; —O.C$_6$H$_5$, —O.C$_6$H$_4$.CH$_3$, —C$_6$H$_5$, —CH$_2$.C$_6$H$_5$ and —NHCO.alkyl, in particular —NHCO.C$_3$H$_7$.

As a basic group which can be quarternised, Z is, for example:

(a) as a basic group, the radicals

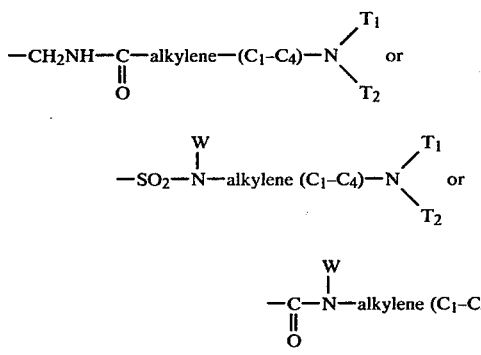

in which T$_1$ is H or a low-molecular alkyl radical, which is unsubstituted or substituted by hydroxy, or a cyclohexyl radical, which is unsubstituted or substituted by 1 to 3 methyl radicals, or a phenyl radical; and T$_2$ is a low-molecular alkyl radical which is unsubstituted or substituted by hydroxyl; or the radicals T$_1$ and T$_2$ together with the N atom can also form a pyrrolidine, pyridine, morpholine or piperazine ring; and W is hydrogen, an unsubstituted alkyl group having 1 to 4 carbon atoms or an alkyl group ($C_1$-$C_4$) substituted by, for example, OH or alkoxy ($C_1$-$C_4$); the radical

being, for example, one of the following radicals:

—N—(CH$_3$)$_2$

—N—(C$_2$H$_5$)$_2$

—NH—CH$_3$

—NH—C$_3$H$_7$

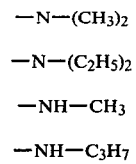

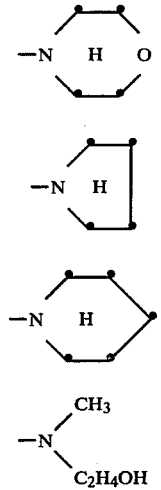

—N—(C$_2$H$_4$OH)$_2$ (b) as a quaternised group, for example, the radical of the formula:

-CH$_2$-NH-CO-alkylene($C_1$-$C_4$)-K$^\oplus$A$^\ominus$ in which K$^\oplus$ is a radical of the formula

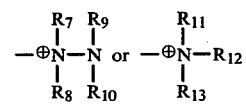

in which R$_7$ and R$_8$ independently of one another are a substituted or unsubstituted alkyl group ($C_1$-$C_4$) or a substituted or unsubstituted cycloalkyl group, or R$_7$ together with R$_8$ and with the inclusion of the N atom forms a heterocyclic ring; R$_9$ and R$_{10}$ independently of one another are hydrogen, substituted or unsubstituted alkyl ($C_1$-$C_4$) or cycloalkyl or an acyl group; R$_{11}$ is hydrogen, substituted or unsubstituted alkyl ($C_1$-$C_4$), substituted or unsubstituted cycloalkyl or substituted or unsubstituted aryl; and R$_{12}$ is hydrogen, substituted or unsubstituted alkyl ($C_1$-$C_4$), substituted or unsubstituted cycloalkyl, substituted or unsubstituted alkoxy or substituted or unsubstituted aryl; or R$_7$ and R$_9$ and/or R$_8$ and R$_{10}$, together with the N atom, form a heterocyclic ring, or R$_{11}$ and R$_{12}$ or R$_{11}$, R$_{12}$ and R$_{13}$, with the inclusion of the N atom, form a heterocyclic ring; the radical K$^\oplus$ being, for example, a radical of the formula:

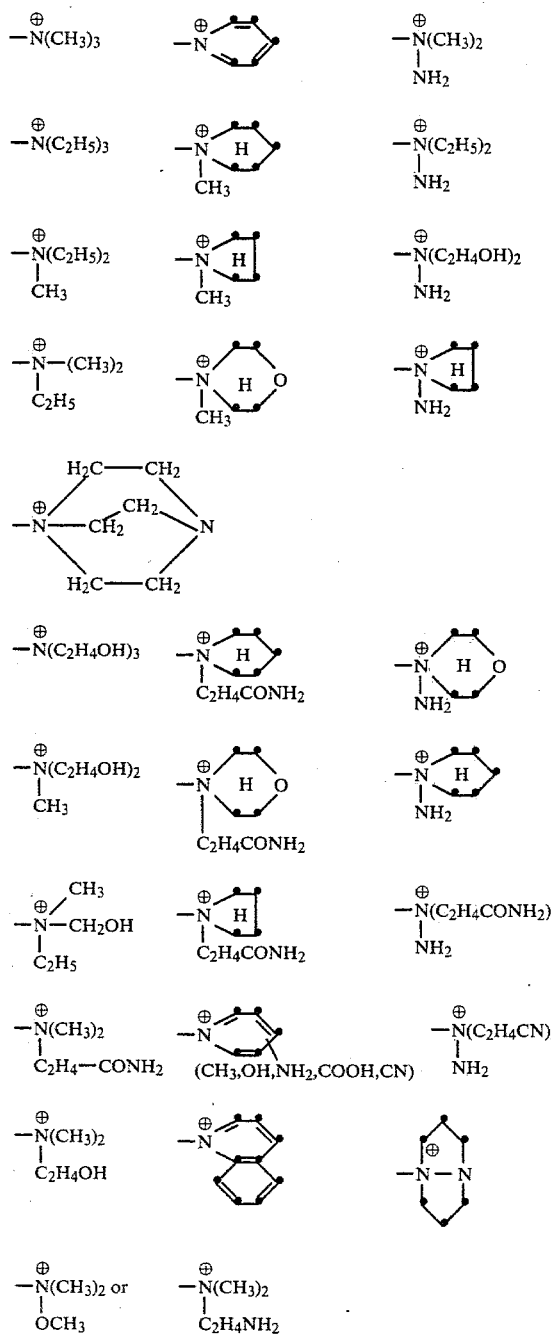

or Z is a cationic group of the formula $$\left[ -SO_2-\underset{\underset{R_{17}}{|}}{\overset{\overset{R_{14}}{|}}{N}}-\text{alkylene }(C_1-C_4)-\underset{\underset{R_{17}}{|}}{\overset{\overset{R_{15}}{|}}{N}}-R_{16} \right]^{\oplus} A^{\ominus}$$

in which "alkylene" is an alkylene bridge which can be interrupted by -O-, -S-, -NH- or

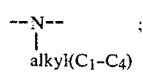

$R_{14}$ is hydrogen or a substituted or unsubstituted alkyl radical; $R_{15}$ and $R_{17}$ are each a substituted or unsubstituted alkyl radical ($C_1$-$C_4$) or a cycloalkyl radical and $R_{16}$ is a substituted or unsubstituted alkyl radical ($C_1$-$C_4$), a cycloalkyl radical, an alkoxy radical or a $NH_2$ group; or two of the radicals $R_{15}$, $R_{16}$ and/or $R_{17}$, together with the nitrogen atom, form a heterocyclic ring; or Z is a cationic group of the formula

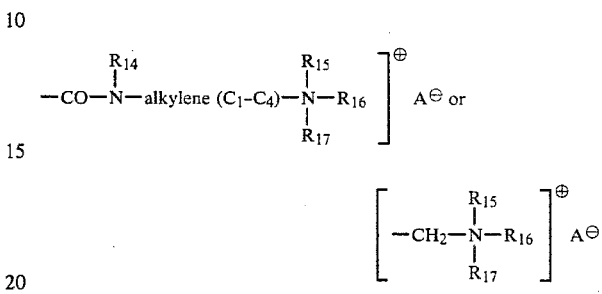

in which the symbols $R_{14}$, alkylene, $R_{15}$, $R_{16}$ and $R_{17}$ are as defined above, and in which $A^{\ominus}$ is an anion in every case.

If Z is a quaternised basic group, anions A are either inorganic or organic anions; examples are: halide ions, such as chloride, bromide or iodide ions, and sulfate, methylsulfate, aminosulfonate, perchlorate, carbonate, bicarbonate, phosphate, molybdophosphate, tungstophosphate, tungstomolybdophosphate, benzenesulfonate, naphthalenesulfonate, 4-chlorobenzenesulfonate, oxalate, maleate, acetate, propionate, lactate, succinate, chloroacetate, tartrate, methanesulfonate or benzoate ions, or complex anions, such as that of zinc chloride double salts.

Preferred anions are, depending on the way in which the compounds are used, for example the acetate ion and chloride ion (for textile and paper materials) and the chloride ion for the preparation of inks.

In preferred dioxazine compounds, Z is a quaternised basic group or a radical containing such a group and n is the number 2 or 3.

An anionic group Y is, for example, the phosphoric acid group, the carboxylic acid group or the sulfonic acid group or a salt form, such as the Na, K, Li or $NH_4$ salt, of this free acid group.

In preferred dioxazine compounds, m is the number 0 and Y is the $SO_3H$ group or a salt form thereof.

Dioxazine compounds of particular interest have the formula I in which Z is a cationic group, n is the number 2 or 3, m is the number 0 and X and $X_1$ are each Cl, and in which A and $A_1$ have the same substituents.

The basic dioxazine compounds of the formula I, which can be quaternised, are compounds which are characterised by brilliant red to blue shades, by the fact that they are not sensitive to the degree of hardness of water and by a high affinity for, in particular, cellulose materials; furthermore, the addition of fixing agents to the application bath is not necessary for the application of these dioxazine compounds.

The basic dioxazine compounds of the formula I, which can be quaternised, are prepared in a known manner. One possibility comprises, for example, (a) introducing a basic group Z, which can be quaternised, into a compound of the formula II

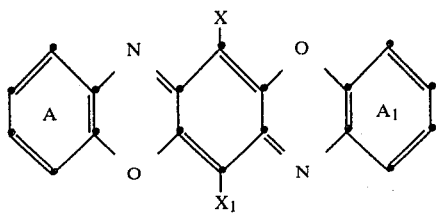

in which the symbols A, A₁, X and X₁ are as defined under formula I, then, if Y is not yet present, introducing an anionic group Y if necessary and, if necessary, quaternising the quaternisable basic group Z with a quaternising agent, or (b) subjecting a compound of the formula III

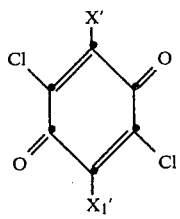

in which X' and X₁' are the same as X and X₁ but are not CN, to a condensation reaction with at least a mols of a compound A-NH₂ and b mols of a compound A₁-NH₂, the sum of a and b being at least 2 and the said compounds A-NH₂ and A₁-NH₂ containing n basic group Z, which can be quaternisable, or n already quaternised basic groups Z, the reaction proceeding with cyclisation to form a dioxazine compound, quaternising a quaternisable basic group Z, which may be present, with a quaternising agent and, if necessary, introducing an anionic group Y.

With regard to process variant (a), the starting compounds of the formula II are known both with and without an anionic group Y (for example U.S. Pat. Nos. 2,016,504, 2,082,344 and 2,026,092) and can be obtained in a known manner. The introduction of a quaternisable basic group Z or the introduction of a group Z which contains a quaternisable group is likewise effected in a known manner, for example by reacting the compound of the formula II with N-methylolchloroacetamide in concentrated H₂SO₄ or phosphoric acid, if necessary in the presence of P₂O₅, at 0°–50° C. and preferably at room temperature, or by first introducing the SO₂Cl group into the compound of the formula II in a conventional manner (for example using chlorosulfonic acid at 100°–150° C.) and then aminating, or by introducing the —CH₂Cl group into the compound of the formula II and then aminating.

Basic groups suitable as a quaternisable basic group Z are all basic groups which are capable of taking up protons during the dyeing process so that they are converted to cationic groups. Examples of such compounds which introduce a basic quaternisable group Z are N-methylolchloroacetamide with subsequent reaction with an amine such as pyridine; alternatively the radical —SO₂Cl is first introduced into the molecule, for example using chlorosulfonic acid, and the compound is then reacted with a diamine, for example 3-dimethylamino-1-propylamine.

If it is desired to convert the quaternisable basic group Z in the compound of the formula II into a quaternised group, the quaternisation is likewise effected in a known manner, for example using quaternising agents in an inert solvent, such as chlorobenzene, or, if desired, in aqueous suspension, or without a solvent in an excess of the quaternising agent, at a temperature of about 20° to 120° C.

Suitable quaternising agents are, for example, alkyl halides, such as methyl chloride or ethyl chloride, methyl bromide, ethyl bromide or butyl bromide or methyl iodide or ethyl iodide, and in particular alkyl sulfates, such as dimethyl sulfate, diethyl sulfate and dibutyl sulfate, or benzyl chloride, chloracetamide, acrylates, epoxides, such as ethylene oxide, epichlorohydrin, alkyl esters of aromatic sulfonic acids, such as methyl p-toluenesulfonate or methyl benzenesulfonate, and also the propyl and butyl esters of benzenesulfonic acid.

If the compounds of the formula II do not contain an anionic group Y, these groups Y can advantageously be introduced prior to the quaternisation reaction for the conversion of the quaternisable group to a quaternised group Z. This is effected, for example, by sulfonation with sulfuric acid or, in order to introduce a phosphoric acid group, by the procedure of U.S. Pat. No. 2,845,420.

After the quaternisation and the introduction of the anionic group Y, which may be carried out, the dioxazine compounds of the formula I are separated from the reaction medium and dried.

With regard to procedure (b), the starting material used in this case is the compound of the formula III, which is subjected to a condensation reaction with a mols of A-NH₂ and b mols of A₁-NH₂, with cyclisation, in a known manner (K. Venkataraman, Volume II (1952) page 786 "The Chemistry of Synthetic Dyes" NY.). If X and/or X₁ in the end product of the formula I are CN, such compounds are prepared, for example, by subjecting the compound of the formula IIIa

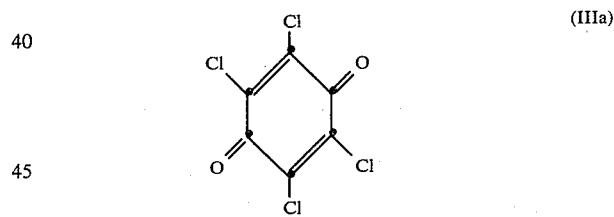

to a condensation reaction with a mols of A-NH₂ and b mols of A₁-NH₂, with cyclisation, in accordance with the above instructions, and then replacing the two Cl atoms by CN groups, for example by reacting the condensation product with CuCN in a known manner, for example in accordance with the procedure of German Offenlegungsschrift No. 2,733,539.

If the amines A-NH₂ and A₁-NH₂ contain a quaternisable basic group Z, the latter can be converted to a quaternised group by a procedure analogous to those described above; if necessary, an anionic group Y is then also introduced, as described further above.

Because of these process measures it is possible to prepare dioxazine compounds of the formula I in which the two symbols A have identical or different substituents. In addition, it is also possible to prepare mixtures which contain dioxazine compounds of the formula I in which the two symbols A have the same substituents and dioxazine compounds of the formula I in which the two symbols A have different substituents.

The novel, basic dioxazine compounds of the formula I, which can be quaternised, are used as dyes for dyeing and printing textile materials, paper and leather and for preparing inks.

If these dyes are used for dyeing and printing textile materials, the materials which can be dyed are wool, silk and acid-modified polyamide materials, and also polyacrylonitrile materials, in particular wet cable, and modified polyester material which can be dyed with basic dyes. However, the materials are in particular natural and regenerated cellulose materials, especially cotton and viscose, on which red to blue dyeings, which are brilliant in some cases, are obtained. The dioxazine compounds of the formula I according to the invention have a good uptake, good exhaustion and good build-up on these textile materials, and in particular on the said cellulose materials, and the resulting dyeings have very good fastness properties, in particular wet fastness properties, such as fastness to washing, and fastness to light. With the basic dioxazine dyes, the wet fastness properties can be even further improved if necessary, by rendering the dyes insoluble, for example by means of an alkaline after-treatment on the fibre. Furthermore, it is an advantage that the dioxazine compounds of the formula I according to the invention are taken up by the cellulose materials without pre-treatment of the said materials and without additional addition of salt to the dye liquor.

The dioxazine compounds of the formula I according to the invention are also used for dyeing paper of all types, in particular bleached, unsized and sized, lignin-free paper. These compounds are very particularly suitable for dyeing unsized paper (tissues) because of their very high standard affinity for this substrate.

The dioxazine compounds according to the invention are taken up very well by these substrates and the waste water remains colourless—even in the case of deep shades (to more than 1/1 SD=standard depth of dyeing)—and this is an eminent technical and ecological advantage, especially with regard to the current laws relating to effluents. The good uptake is also advantageous for good reproducibility of the shade. The hardness of the water has virtually no influence on the uptake. The dyeings are fast to wet processing, i.e. they show no tendency to staining when dyed paper in the wet state is brought into contact with moist white paper. This characteristic is particularly desirable for so-called tissues, with which it is foreseeable that the dyed paper will come into contact in the wet state (for example saturated with water, alcohol, surfactant solution or the like) with other surfaces such as textiles, paper and the like, which have to be protected against soiling.

The high affinity for paper and the high rate of exhaustion of the dioxazine dyes according to the invention are a great advantage for the continuous dyeing of paper and thus make possible a wider application of this known, highly economical process, which has the following advantages:

(a) simpler and more rapid correction of the shade and thus less loss of paper which does not conform to type (wastage) compared with the discontinuous dyeing of paper pulp;
(b) better constancy of the shade; (no "trailing") and
(c) if the dye is metered in just upstream of the flow box, in the low-density pulp, thorough cleaning of the beater, the blending chest and the like after each batch can be dispensed with, thus shortening the process and streamlining the procedure at the same time.

The dioxazine compounds of the formula I are also used for dyeing leather materials by very diverse application processes, such as spraying, brushing and immersion, and for the preparation of inks of all types, such as for ballpoint pens and printing inks.

Finally, the novel dioxazine compounds of the formula I are also suitable for bulk dyeing linear synthetic high-molecular weight polyamides, such as polyhexamethyleneadipamide. Dyeing of the polyamide chips is effected, in particular, from an aqueous bath in the presence of wetting agents or dispersing agents and, if desired, salts, with subsequent melting and shaping.

With regard to the reducible characteristics of the molten high-molecular weight polyamide melts and the high melt temperature (about 270°–300° C.), the use of these dyes of the formula I constitutes a surprising enrichment of the art.

The following examples illustrate the invention without restricting it thereto. The temperatures are in degrees centigrade and parts (P) and percentages are by weight.

EXAMPLE 1

A mixture of 57 P of the compounds of the formula

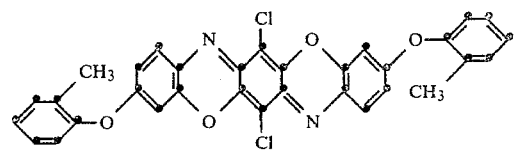

(the condensation product of chloranil and 1-amino-2,4-o-methylphenoxy-benzene) and 28 P of N-methylol-chloroacetamide is introduced at 0°–5° into 500 P of 90% sulfuric acid and the mixture is stirred at 0°–5° for 15 hours. The reaction product is precipitated on ice and is filtered off again, with suction, and washed with water. After drying, this yields 72 P of the compound of the formula:

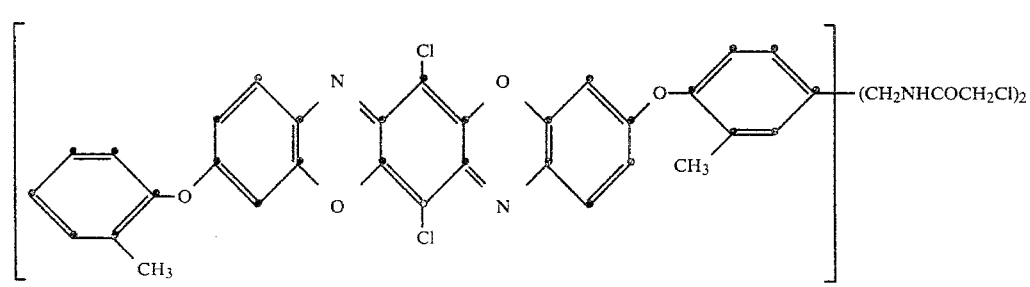

60 P of the product thus obtained are introduced into 400 P of pyridine and the mixture is warmed at 100° for 1 hour. The dye of the formula:

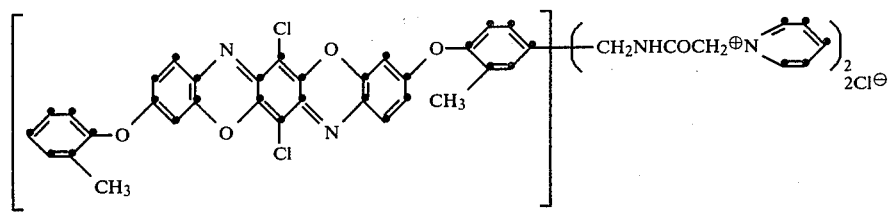

which has precipitated is filtered off with suction and dried. It displays a very good uptake on paper and cotton, and the pale red dyeings have a good spectrum of fastness properties.

When the above examples is repeated replacing pyridine by α- or γ-picoline or by a mixture of α-/γ-picoline or by triethylenediamine or N,N-dimethylhydrazine or N,N-dimethylethanolamine, similar dyes are obtained which have equally good coloristic properties.

When the 57 P of the condensation product of chloranil and 1-amino-2,4-o-methylphenoxy-benzene are replaced by equivalent parts of the condensation products listed in Table 1 below and these products are reacted with 28 P of N-methylolchloroacetamide and the reaction products are aminated with pyridine, an otherwise identical procedure yields cationic dioxazine dyes of the formula indicated in column 3; the colour shade of these dyes on cotton is indicated in the last column of the table.

TABLE I

| Example | Condensation product X/X₁ | a | b | Dioxazine dye c | d | Shade on cotton |
|---|---|---|---|---|---|---|
| 2 | CONH₂ | H | O—⌬—CH₃ | H | H | red |
| 3 | CONH—⌬ | " | " | " | " | red |
| 4 | Cl | Cl | " | " | " | red |
| 5 | Br | Cl | O—⌬ | " | " | red |
| 6 | Cl | H | O—C₃H₇ | H | H | ruby |
| 7 | NH—CO—⌬—Cl | H | O—C₂H₅ | H | H | red |
| 8 | Cl | Cl | O—CH₃ | " | " | ruby |
| 9 | H | " | " | " | " | red |
| 10 | NH—CO—⌬S | H | O—C₂H₅ | " | " | red |
| 11 | CN | H | —OC₂H₄OCH₃ | H | H | red |
| 12 | Cl | " | —CH₃ | " | " | red |
| 13 | Cl | H | —CH₂—⌬ | H | H | red |
| 14 | " | " | —⌬ | " | " | red |
| 15 | " | " | —NHCO—⌬ | " | " | violet |
| 16 | Cl | H | —NHCO—⌬—OCH₃ | H | H | ruby |
| 17 | " | " | —NHCO—⌬ | Cl | " | violet |

TABLE I-continued

| Example | Condensation product X/X₁ | a | b | c | d | Shade on cotton |
|---|---|---|---|---|---|---|
| 18 | COOC₂H₅ | H | —NHCO—furan | Cl | H | violet |
| 19 | Cl | " | —NHCO—furan | —OC₂H₅ | " | violet |
| 20 | NHCOCH₃ | H | —NHCO—furan | —OC₂H₅ | H | violet |
| 21 | OCOCH₃ | " | —NHCO—furan | —OC₂H₅ | " | violet |
| 22 | Cl | " | —NHCO—furan—Cl | —OCH₃ | " | violet |
| 23 | NHCO—thiophene | H | —NH—CO—furan | —OC₂H₅ | H | reddish-tinged blue |
| 24 | Cl | H | H | CONH—biphenyl | H | red |
| 25 | " | " | NHCOCH—CH₃ with OH | —OCH₃ | " | violet |
| 26 | CONH—furan | " | H | H | " | red |
| 27 | Cl | " | NH—furan | —OCH₂CH₂OH | " | reddish-tinged blue |

EXAMPLE 28

58 P of the disulfochloride of the compound of the formula:

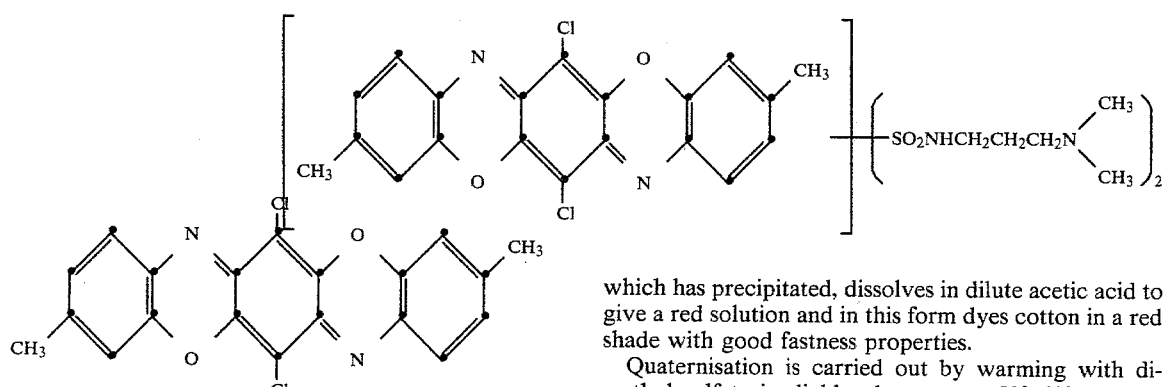

(obtained by a condensation reaction of chloranil with 1-amino-2-methoxy-5-methylbenzene and subsequent chlorosulfonation according to British Pat. No. 815,840) are suspended in water and 22 P of 3-dimethylamino-1-propylamine are added. The reaction mixture is stirred for 15 hours at room temperature and finally is stirred for a further 3 hours at 60°. The basic dye of the formula which has precipitated, dissolves in dilute acetic acid to give a red solution and in this form dyes cotton in a red shade with good fastness properties.

Quaternisation is carried out by warming with dimethyl sulfate in dichlorobenzene at 50°–60° and the cationic dye of the formula

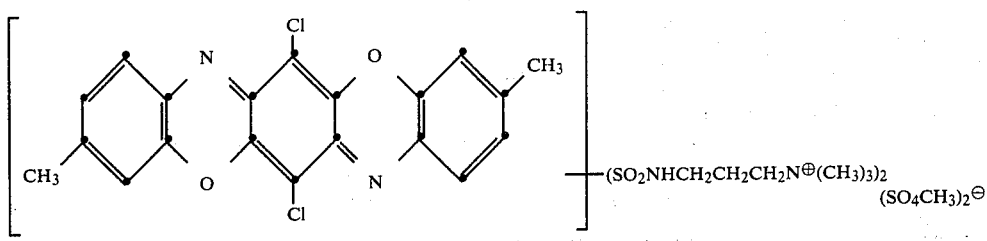

is obtained; when used to dye cotton, this dye gives a red shade with good fastness properties.

When the quaternisation is carried out with ethylene chlorohydrin instead of with dimethyl sulfate, a similar dye is obtained which has equally good coloristic properties.

When the abovementioned condensation product of chloranil and 1-amino-2-methoxy-5-methylbenzene is replaced by equivalent parts of one of the condensation products listed in Table 2 below, an otherwise identical procedure yields cationic dioxazine dyes of the formula indicated in column 3; the shade of these dyes on cotton is indicated in the last column of the table.

EXAMPLE 38

12 P of the disulfochloride obtained according to Example 28 are suspended in 100 P of water at 0°–5° and 8 P of 2-chloroethylamine hydrochloride are added. After adding 50 P of 10% aqueous sodium hydroxide solution, the reaction mixture is stirred for a further 15 hours at room temperature. The di-2-chloroethyl-sulfamide thus obtained is filtered off with suction and stirred with 250 parts of a 50% aqueous solution of dimethylamine for 24 hours at room temperature. The basic dioxazine dye of the formula

TABLE 2

| Example | Condensation product X/X₁ | a | b | Dioxazine dye c | d | Shade on cotton |
|---|---|---|---|---|---|---|
| 29 | Cl | H | H | H | H | red |
| 30 | " | " | (furan) | " | " | red |
| 31 | " | —O—(furan) | H | " | " | red |
| 32 | " | H | (benzothiazole-CH₃) | " | " | violet |
| 33 | Cl | H | NH—(furan) | H | H | blue |
| 34 | X = CH₃; X₁ = H | H | (furan) | H | H | red |
| 35 | Cl | " | NHCO—(furan) | CH₃ | " | reddish-tinged blue |
| 36 | " | " | H | —CH₂—(furan) | " | red |
| 37 | Cl | H | NH—(pyrimidinone) | H | H | blue |

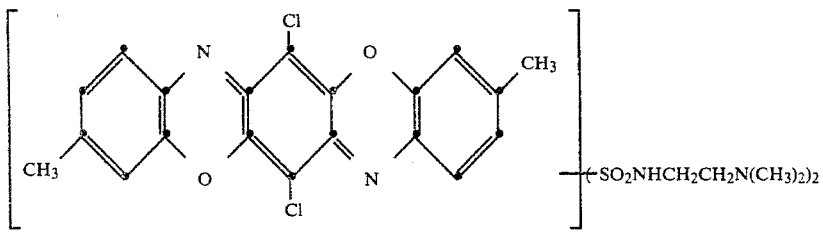

is isolated and quaternised to give a cationic dye, in the manner described in Example 28.

EXAMPLE 39

Using the same procedure as in Example 28, 48 P of the dicarboxylic acid chloride of the compound of the formula

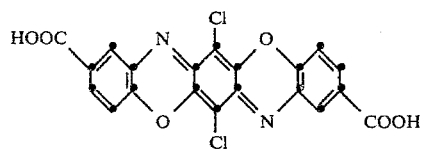

(obtained in accordance with U.S. Pat. No. 2,564,381) are converted to a cationic dioxazine dye of the formula This dye dyes cotton and paper in red shades with good fastness properties.

Using the dioxazine-dicarboxylic acids listed in Table 3 as the starting materials, an otherwise identical procedure yields similar cationic dyes which have a —CONHCH$_2$CH$_2$CH$_2$N$^\oplus$(CH$_3$)$_3$] (SO$_4$CH$_3^\ominus$)

in the position of the COOH group or groups; the shades of these dyes on cotton are given in the last column of the table.

TABLE 3

Dioxazinedicarboxylic acid

| Example | X/X$_1$ | a | b | c | d | Shade on cotton |
|---|---|---|---|---|---|---|
| 40 | Cl | H | COOH | H | H | red |
| 41 | " | " | COOH | Cl | " | red |
| 42 | Br | " | H | COOH | " | red |
| 43 | Br | H | COOH | H | H | red |
| 44 | Cl | " | —⟨ ⟩—COOH | " | " | red |
| 45 | COOH | H | H | H | H | red |
| 46 | COOH | " | " | —CO—⟨ ⟩ | " | blue/red |

EXAMPLE 47

50 P of chemically bleached beech sulfite are mixed with 50 P of bleached sulfite RKN 15 (freeness 22° SR) and 3 P of the dye of the formula

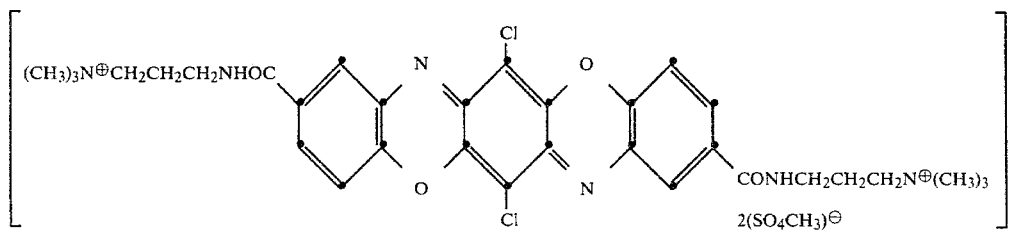

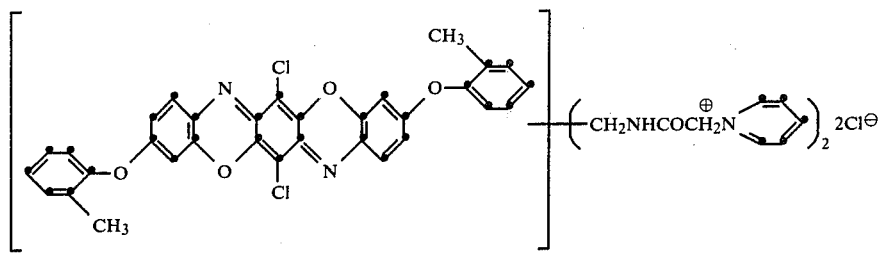

in water (pH 6, water hardness 10° German hardness, temperature 20°, liquor ratio 1:40).

After stirring for 15 minutes, sheets of paper are produced on a Frank sheet-former.

The paper is dyed in a very intense red shade which is fast to light and wet processing. The waste water is completely colourless (the degree of exhaustion reaches more than 99%).

EXAMPLE 48

100 P of chemically bleached Sulfate Stora 32 (freeness 25° SR) and 1 P of the dye of the formula

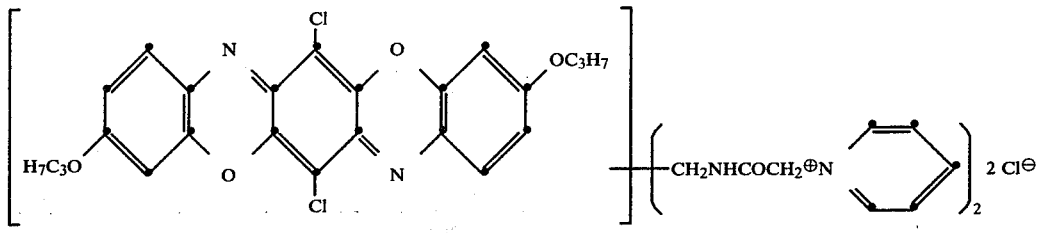

are mixed in water (pH 6, water hardness 8° German hardness, temperature 20°, liquor ratio 1:40). After stirring for 15 minutes, sheets of paper are produced on a Frank sheet-former. The paper has an intense ruby shade. The fastness to light and the wet fastness properties of the dyeings are good. The waste water is virtually colourless (degree of exhaustion about 97%).

EXAMPLE 49

A paper web is produced from 50% beech sulfite and 50% Sulfite RKN 15 (bleached) on a laboratory papermaking machine which operates continuously. A solution of the dye according to Example 47 is metered continuously into the low-density pulp ten seconds before the flow box. (0.5% dyeing, liquor ratio 1:400, water hardness 10° German hardness, pH 6, temperature 20°, freeness of the paper 22° SR).

A level dyeing in a red shade which is of average intensity and fast to wet processing and light results. Despite the short contact time, the waste water is completely colourless.

EXAMPLE 50

2 P of the dye according to Example 47 are introduced into 100 P of chemically bleached sulfite (freeness 22° SR). After stirring for 10 minutes (at 20°, pH 6, liquor ratio 1:40, water hardness 10° German hardness), 2 P of resin size are added. After stirring for a further 10 minutes, 3 P of aluminium sulfate are added. This paper pulp is stirred for a further 5 minutes and used to produce sheets on a Frank sheet-former. The paper is dyed intense red and is fast to wet processing and light. The waste water is completely colourless.

EXAMPLE 51

10 P of cotton fabric (bleached mercerised cotton) are dyed in a laboratory beam dyeing apparatus in 200 P of a liquor (water hardness 10° German hardness, pH 6, dye liquor circulated 3 times per minute) which contains 0.025 P of the dye according to Example 47. The temperature is first kept at 20° for 15 minutes and is then raised to 100° in the course of 40 minutes.

A red shade of medium intensity results. The dyeing is distinguished by very good wet fastness properties. The degree of exhaustion reaches about 98%.

What is claimed is:

1. A dioxazine compound of the formula I

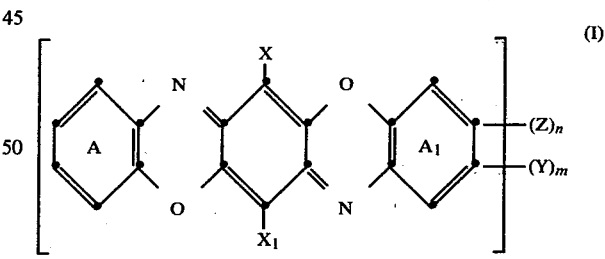

wherein Z is (a) a basic group of the formula

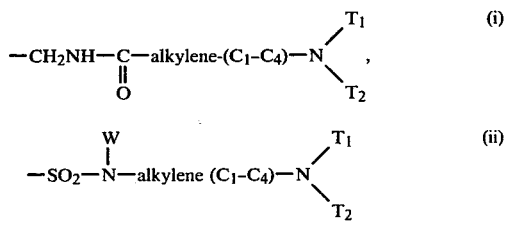

or

-continued

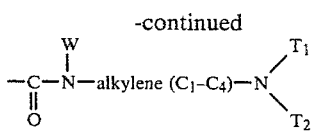 (iii)

wherein $T_1$ is hydrogen; $C_1$-$C_4$ alkyl which is unsubstituted or substituted by OH; cyclohexyl which is unsubstituted or substituted by 1-3 methyl groups; or phenyl; $T_2$ is $C_1$-$C_4$ alkyl which is unsubstituted or substituted by hydroxyl; or $T_1$ and $T_2$, together with the nitrogen atom to which they are attached, form a pyrrolidine, pyridine, morpholine or piperazine ring; and W is hydrogen or $C_1$-$C_4$ alkyl which is unsubstituted or substituted by OH or $C_1$-$C_4$ alkoxy; or (b) a cationic group of the formula $$-CH_2-NH-CO\text{-alkylene}(C_1-C_4)\text{-}K^{\oplus}A^{\ominus} \quad (i)$$

in which $K^{\oplus}$ is a radical of the formula

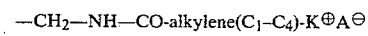

wherein $R_7$ and $R_8$, each independently of the other, is $C_1$-$C_4$ alkyl which is unsubstituted or substituted by OH, carbamoyl or cyano, or $R_7$ and $R_8$, together with the nitrogen atom to which they are attached, form a pyrrolidine, piperidine or morpholine ring; $R_9$ and $R_{10}$ are H or $C_1$-$C_4$ alkyl; or $R_7$ and $R_9$ and $R_8$ and $R_{10}$ together with the nitrogen atoms to which they are attached, form a 1,2-diazabicyclo-(3.3.0)-octane ring system; $R_{11}$ is H or $C_1$-$C_4$ alkyl which is unsubstituted or substituted by OH; $R_{12}$ and $R_{13}$, each independently of the other, is hydrogen, phenyl, $C_1$-$C_4$ alkoxy or $C_1$-$C_4$ alkyl which is unsubstituted or substituted by OH, carbamoyl or $NH_2$; or $R_{11}$ and $R_{12}$, together with the nitrogen atom to which they are attached, form a piperadine, pyrrolidine or morpholine ring; or $R_{11}$, $R_{12}$ and $R_{13}$, together with the nitrogen atom to which they are attached, form a pyridine ring which is unsubstituted or substituted by methyl, OH, $NH_2$, carboxy or CN or is annulated to form a quinoline radical; or $R_{11}$, $R_{12}$ and $R_{13}$, together with the nitrogen atom to which there are attached, form a 1,4-diazabicyclo-(2.2.2.)-octane ring system; or Z is a cationic group of the formula

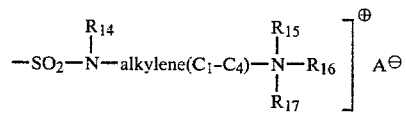 (ii)

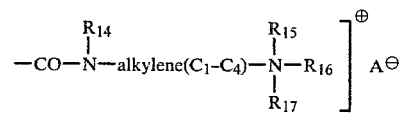 (iii)

or

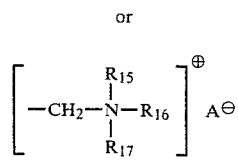 (iv)

wherein alkylene is an alkylene bridge which can be interrupted by —O—, —S—, —NH— or

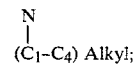

$R_{14}$ is H or $C_1$-$C_4$ alkyl; $R_{15}$ and $R_{17}$, each independently of the other, is $C_1$-$C_4$ alkyl; $R_{16}$ is $C_1$-$C_4$ alkyl, $C_1$-$C_4$ alkoxy or $NH_2$; or $R_{15}$ and $R_{16}$ together with the nitrogen to which they are attached is pyridinium; $A^-$ is an anion;

Y is an anionic group;

each of X and $X_1$, independently of the other, is H; halogen; CN; $C_1$-$C_4$ alkyl; phenyl which is unsubstituted or substituted by $C_1$-$C_4$ alkyl or halogen; $NHCOR_1$ wherein $R_1$ is $C_1$-$C_4$ alkyl, cyclohexyl, aryl which is unsubstituted or substituted by $C_1$-$C_4$ alkyl or halogen, or $R_1$ is a heterocycle selected from the group consisting of furane, thiophene, pyridine, quinoline, phenylthiazole and phenyltriazole; $OCOR_2$ wherein $R_2$ is $C_1$-$C_4$ alkyl which is unsubstituted or substituted by phenyl, or $R_2$ is cyclohexyl;

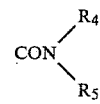

wherein $R_4$ and $R_5$, each independently of the other, is hydrogen, cyclohexyl, aryl, $C_1$-$C_4$ alkyl which is unsubstituted or substituted by phenyl,

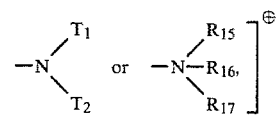

wherein $T_1$, $T_2$, $R_{15}$, $R_{16}$ and $R_{17}$ are as defined above, or $R_4$ and $R_5$, together with the nitrogen atom to which they are attached, form a pyrrolidine, piperidine or morpholine ring; or $COOR_6$ wherein $R_6$ is hydrogen, cyclohexyl or $C_1$-$C_4$ alkyl which is unsubstituted or substituted by OH or phenyl;

each of the benzene radicals A and $A_1$, independently of the other, is unsubstituted or substituted by one or more substituents selected from the group consisting of halogen; CN; $C_1$-$C_8$ alkyl which is unsubstituted or substituted by phenyl; phenyl which is unsubstituted or substituted by halogen, $C_1$-$C_4$ alkyl or $C_1$-$C_4$ alkoxy; COOH; $NO_2$; $NH_2$; mono- or di-$(C_1$-$C_4)$-alkyl amino; $NHCO-C_6H_5$; $NHCOR_{18}$ where $R_{18}$ is $C_1$-$C_4$ alkyl which is unsubstituted or substituted by phenyl, $C_1$-$C_4$ alkoxy, cyclohexyl or phenyl which is unsubstituted or substituted by halogen, $C_1$-$C_4$ alkoxy, $C_1$-$C_4$ alkyl, $NO_2$ or CN; SCN; benzothiazole which is unsubstituted or substituted by $C_1$-$C_4$ alkyl; $C_1$-$C_4$ alkoxy which is unsubstituted or substituted by $C_1$-$C_4$ alkyl, $C_1$-$C_4$ alkoxy, OH or phenyl; phenoxy which is unsubstituted or substituted by $C_1$-$C_4$ alkyl; $NHR_{19}$ wherein $R_{19}$ is H or phenyl which is unsubstituted or fused with a hetero ring to form a benzoxazole, benzthiazole or benzimidazole; $C_1$-$C_4$ alkylsulfonyl; or $CONHR_{20}$, wherein $R_{20}$ is phenyl which is unsubstituted or substituted by halogen, phenyl or $C_1$-$C_4$ alkyl;

n is a number from 1 to 4 and m a number from 0 to 2, with the proviso that number m is small than n.

2. A dioxazine compound of the formula I according to claim 1, wherein Z is a quaternised basic group.

3. A dioxazine compound of the formula I according to claim 1, wherein n is the number 2 or 3.

4. A dioxazine compound of the formula I according to claim 1, wherein m is the number 0.

5. A dioxazine compound of the formula I according to claim 1, wherein X and $X_1$ are identical substituents.

6. A dioxazine compound of the formula I according to claim 5, wherein X and $X_1$ are each chlorine.

7. A dioxazine compound of the formula I according to claim 1, wherein the two benzo radicals A and $A_1$ are substituted by one or more identical substituents.

8. A dioxazine compound according to claim 1, wherein the benzo radicals A and $A_1$ are monosubstituted or polysubstituted by Cl, $NHCOC_6H_5$, $NHCOC_6H_4Cl$, $NHCOC_6H_4OCH_3$, alkoxy ($C_1$-$C_3$), alkoxy ($C_1$-$C_3$) substituted by OH or alkoxy or by alkyl, in particular $CH_3$; —O—$C_6H_5$, —O—$C_6H_4$—$CH_3$, —$C_6H_5$, —$CH_2$—$C_6H_5$ and —NHCO-alkyl, in particular —NHCO—$C_3H_7$.

9. A dioxazine compound of the formula I according to claim 1, wherein X and $X_1$ are chlorine, the benzo radicals A and $A_1$ are monosubstituted by $C_1$-$C_3$ alkoxy or phenoxy which is unsubstituted or substituted by methyl, Z is —$CH_2NHCOCH_2$-pyridyl, n is 2 and m is 0.

10. A dioxazine compound according to claim 1 of the formula

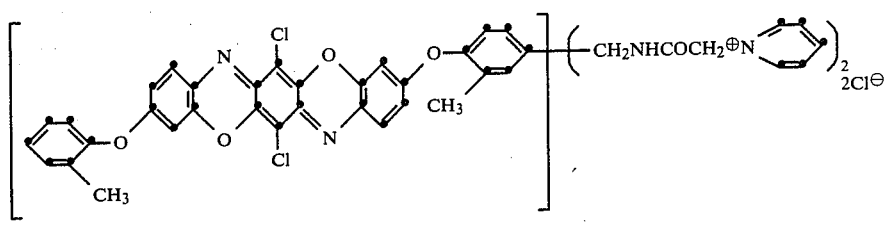

* * * * *